US012052988B2

(12) United States Patent
Sato et al.

(10) Patent No.: US 12,052,988 B2
(45) Date of Patent: *Aug. 6, 2024

(54) ANTIBACTERIAL LIQUID, ANTIBACTERIAL FILM, SPRAY AND CLOTH

(71) Applicant: FUJIFILM Corporation, Tokyo (JP)

(72) Inventors: Naotoshi Sato, Fujinomiya (JP); Mitsumasa Hamano, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 11 days.

This patent is subject to a terminal disclaimer.

(21) Appl. No.: 17/902,109

(22) Filed: Sep. 2, 2022

(65) Prior Publication Data
US 2022/0408723 A1 Dec. 29, 2022

Related U.S. Application Data

(63) Continuation of application No. 15/902,173, filed on Feb. 22, 2018, now abandoned, which is a continuation of application No. PCT/JP2016/074502, filed on Aug. 23, 2016.

(30) Foreign Application Priority Data

Aug. 25, 2015 (JP) ................................ 2015-165913
Jun. 15, 2016 (JP) ................................ 2016-119222

(51) Int. Cl.
A01N 25/04 (2006.01)
A01N 25/08 (2006.01)
A01N 59/16 (2006.01)
C08K 5/05 (2006.01)
C08K 9/02 (2006.01)
C08K 9/12 (2006.01)
C08L 83/04 (2006.01)
C09D 5/14 (2006.01)
C09D 7/20 (2018.01)
C09D 7/40 (2018.01)
C09D 7/62 (2018.01)
C09D 183/00 (2006.01)
C09D 183/04 (2006.01)

(52) U.S. Cl.
CPC ............ A01N 25/04 (2013.01); A01N 25/08 (2013.01); A01N 59/16 (2013.01); C08K 5/05 (2013.01); C08L 83/04 (2013.01); C09D 5/14 (2013.01); C09D 7/20 (2018.01); C09D 7/62 (2018.01); C09D 7/68 (2018.01); C09D 183/00 (2013.01); C09D 183/04 (2013.01); C08K 9/02 (2013.01); C08K 9/12 (2013.01)

(58) Field of Classification Search
CPC ........ A01N 25/04; A01N 25/08; A01N 59/16; C09D 5/14; C09D 7/20; C09D 7/62; C09D 7/68; C09D 183/00; C09D 183/04; C08K 5/05; C08K 9/02; C08K 9/12; C08L 83/04
See application file for complete search history.

(56) References Cited

U.S. PATENT DOCUMENTS

| 4,838,914 | A | 6/1989 | Ohta et al. |
| 6,436,422 | B1* | 8/2002 | Trogolo ................ A61L 29/16 424/490 |
| 10,433,541 | B2* | 10/2019 | Hamano ................ A01N 25/04 |
| 2002/0185199 | A1* | 12/2002 | Myers .................... A01N 59/16 148/537 |
| 2006/0008539 | A1 | 1/2006 | Tomioka |
| 2010/0150980 | A1 | 6/2010 | Bokorny et al. |
| 2010/0293994 | A1* | 11/2010 | Murayama ............... C08F 8/42 424/618 |
| 2015/0092123 | A1 | 4/2015 | Gotoh et al. |

FOREIGN PATENT DOCUMENTS

| CN | 102613244 A | 8/2012 |
| EP | 0931811 A1 | 7/1999 |
| JP | H10-279885 A | 10/1998 |
| JP | H11-279540 A | 10/1999 |
| JP | 2003-136054 A | 5/2003 |
| JP | 2003-206139 A | 7/2003 |

(Continued)

OTHER PUBLICATIONS

Communication dated Jan. 27, 2020 from European Patent Office in EP Application No. 16 839 273.6.
Communication dated Jun. 16, 2020 from the State Intellectual Property Office of the P.R. of China in Application No. 201680049097.2.
Communication dated May 15, 2019, from the European Patent Office in corresponding European Application No. 16839273.6.
Communication dated May 18, 2018 from the European Patent Office in counterpart European application No. 16839273.6.
Communication dated Nov. 21, 2019, issued by the State Intellectual Property Office of the P.R.C. in Chinese application No. 201680049097.2.

(Continued)

Primary Examiner — Hong Yu
(74) Attorney, Agent, or Firm — Sughrue Mion, PLLC

(57) ABSTRACT

Provided is an antibacterial liquid with excellent temporal stability in which caking due to sedimentation of solid components does not occur and with which a film capable of stably maintaining antibacterial properties can be formed, in a case of being formed into a film. Also provided are an antibacterial film formed using the antibacterial liquid, and a spray and a cloth including the antibacterial liquid. The antibacterial liquid includes an antibacterial microparticle, a binder, and a solvent, in which the antibacterial microparticle contains a silver-supporting inorganic oxide, the binder includes at least one compound having a siloxane bond, the solvent includes an alcohol and water, the concentration of solid contents is less than 5% by mass with respect to the total mass of the antibacterial liquid, and the content of the compound having a siloxane bond is 60% by mass or more with respect to the total solid content of the antibacterial liquid.

14 Claims, No Drawings

(56) References Cited

FOREIGN PATENT DOCUMENTS

| JP | 2005-060695 A | 3/2005 |
|---|---|---|
| WO | 2015/166858 A1 | 11/2015 |

OTHER PUBLICATIONS

Communication dated Sep. 11, 2018 issued by the Japanese Patent Office in counterpart Japanese application No. 2016-119222.

International Preliminary Report on Patentability dated Feb. 27, 2018, in counterpart International Application No. PCT/JP2016/074502.

International Search Report dated Nov. 8, 2016, in counterpart International Application No. PCT/JP2016/074502.

Tangyung et al., "Specialized Design and Processing Examples of Functional Plastic Products", National Defense Industry Publisher, p. 222 (2 pages total), published on Jan. 31, 2006.

Written Opinion of the International Searching Authority dated Nov. 8, 2016, in counterpart International Application No. PCT/JP2016/074502.

Solid: retrieved from internet: https://dictinoary.cambridge.org/us/dictionary/english/solid. Retrieved on Jan. 5, 2020.

Solid: retrieved from internet: https://www.merriam-webster.com/dictionary/solid. Retrieved on Jan. 5, 2020.

* cited by examiner

ANTIBACTERIAL LIQUID, ANTIBACTERIAL FILM, SPRAY AND CLOTH

CROSS-REFERENCE TO RELATED APPLICATIONS

This application is a Continuation of U.S. application Ser. No. 15/902,173 filed on Feb. 22, 2018, which is a Continuation of PCT International Application No. PCT/JP2016/074502 filed on Aug. 23, 2016, which claims priority under 35 U.S.C. § 119(a) to Japanese Patent Application No. 2015-165913 filed on Aug. 25, 2015 and Japanese Patent Application No. 2016-119222 filed on Jun. 15, 2016. Each of the above applications is hereby expressly incorporated by reference, in its entirety, into the present application.

BACKGROUND OF THE INVENTION

1. Field of the Invention

The present invention relates to an antibacterial liquid and an antibacterial film formed using the antibacterial liquid. The present invention further relates to a spray and a cloth containing the antibacterial liquid.

2. Description of the Related Art

In the related art, JP1998-279885A (JP-H10-279885A) discloses "a functional coating composition including (a) in terms of organoalkoxysilane, 10 to 50 parts by weight of organoalkoxysilane represented by General Formula $R^1Si(OR^2)_3$ (in the formula, $R^1$ represents an organic group having 1 to 10 carbon atoms, and $R^2$ represents an alkyl group having 1 to 5 carbon atoms and/or an acyl group having 1 to 4 carbon atoms), a hydrolysate of the organoalkoxysilane, and a partial condensate and/or a complete condensate thereof, (b) 1 to 20 parts by weight of a synthetic resin, (c) 1 to 20 parts by weight of a fine particulate metal oxide or carbon black, (d) in terms of a metal content, 0.001 to 1.5 parts by weight of at least one selected from a silver salt, a copper salt, and colloidal silver, (e) 5 to 75 parts by weight of a hydrophilic organic solvent, and (f) 5 to 40 parts by weight of water [here, (a)+(b)+(c)+(d)+(e)+(f)=100 parts by weight], as main components, in which a concentration of solid contents is 5 to 50% by weight", as an antibacterial liquid.

SUMMARY OF THE INVENTION

As a result of conducting an investigation on the functional coating composition (antibacterial liquid) specifically disclosed in JP1998-279885A (JP-H10-279885A), the present inventors found that antibacterial microparticles that are solid components in the antibacterial liquid sediment and solidify with a binder (so-called "caking") in a case in which the composition is stored for a long period of time. The present inventors also found that, once the caking occurs, the solid components hardly return to the original dispersed state even in a case in which the antibacterial liquid is subjected to vibration, indicating that it is necessary to improve the temporal stability of the antibacterial liquid.

On the other hand, in a case in which an antibacterial film is formed using the antibacterial liquid described in JP1998-279885A (JP-H10-279885A), the antibacterial film thus obtained is left to stand in a weak alkali environment such as alkali hot spring, and a predetermined period of time has elapsed after the film is left to stand, antibacterial properties were found to be significantly degraded. This is considered to be caused by the destruction of a three-dimensional structure of the antibacterial film due to the breaking of a siloxane bond in the siloxane network constituting the three-dimensional structure by an $OH^-$ ion contained in an alkali component. That is, it is considered that the film is peeled off by the destruction of the structure, leading to damages on the antibacterial microparticles supported by siloxane as well, and thus the antibacterial properties are degraded. Therefore, it is understood that additional improvements are needed in maintaining the antibacterial properties after film formation.

An object of the invention is to provide an antibacterial liquid with excellent temporal stability in which caking due to sedimentation of solid components does not occur and with which a film capable of stably maintaining antibacterial properties can be formed.

Another object of the invention is to provide an antibacterial film formed using the antibacterial liquid.

Still another object of the invention is to provide a spray and a cloth containing the antibacterial liquid.

The present inventors conducted a thorough investigation in order to achieve the above objects, and as a result, the inventors found that the desired effects of the invention are exhibited by adjusting the concentrations of the solid components with respect to the total mass of the antibacterial liquid and the content of a compound having a siloxane bond with respect to the total solid content of the antibacterial liquid, thus completing the invention.

That is, the inventors found that the objects can be achieved by the following configuration.

(1) An antibacterial liquid comprising: an antibacterial microparticle; a binder; and a solvent, in which the antibacterial microparticle contains a silver-supporting inorganic oxide, the binder includes at least one compound having a siloxane bond, the solvent includes an alcohol and water, the concentration of solid contents is less than 5% by mass with respect to the total mass of the antibacterial liquid, and the content of the compound having a siloxane bond is 60% by mass or more with respect to the total solid content of the antibacterial liquid.

(2) The antibacterial liquid according to (1), in which the average particle size of the silver-supporting inorganic oxide is 0.05 μm or more and less than 1.0 μm.

(3) The antibacterial liquid according to (1) or (2), in which the silver-supporting inorganic oxide is silver-supporting glass.

(4) An antibacterial film formed using the antibacterial liquid according to any one of (1) to (3).

(5) The antibacterial film according to (4), which is not removable by a solution having a pH of 11 or lower.

(6) A spray comprising the antibacterial liquid according to any one of (1) to (3).

(7) A cloth comprising the antibacterial liquid according to any one of (1) to (3).

According to the invention, an antibacterial liquid with excellent temporal stability in which caking due to sedimentation of solid components does not occur and with which a film capable of stably maintaining antibacterial properties can be formed can be provided.

Also, according to the invention, an antibacterial film formed using the antibacterial liquid can be provided.

Furthermore, according to the invention, a spray and a cloth containing the antibacterial liquid can be provided.

DESCRIPTION OF THE PREFERRED EMBODIMENTS

Hereinafter, the invention will be described in detail.

The following description regarding the constitutional elements is based on the representative embodiments of the invention, but the invention is not limited to such embodiments.

A numerical value range expressed using "to" in the present specification means a range including the numerical values described before and after "to" as the lower limit and the upper limit.

[Antibacterial Liquid]

The antibacterial liquid of the invention is an antibacterial liquid including antibacterial microparticles, a binder, and a solvent, in which the antibacterial microparticles contain a silver-supporting inorganic oxide, the binder includes at least one compound having a siloxane bond, the solvent includes an alcohol and water, the concentration of solid contents is less than 5% by mass with respect to the total mass of the antibacterial liquid, and the content of the compound having a siloxane bond is 60% by mass or more with respect to the total solid content of the antibacterial liquid.

By having such a configuration, the antibacterial liquid has excellent temporal stability without caking due to the sedimentation of solid components, and a film formed using the antibacterial liquid can stably maintain the antibacterial properties.

The detailed mechanism behind this is not clearly understood, but is presumed to be as follows.

First, by setting the concentration of solid contents to be less than 5% by mass with respect to the total mass of the antibacterial liquid, the solid components do not easily sediment even in a case in which an antibacterial agent is stored for a long period of time, and caking hardly occurs, and thus the temporal stability is excellent. It is presumed that the reason for this is that dispersibility of the solid components in the liquid becomes satisfactory, and aggregation proportion between the antibacterial microparticles and contact frequency between the antibacterial microparticles and the binder in the liquid is decreased by setting the concentration of solid contents to be less than 5% by mass. Even in a case in which the sedimentation of the antibacterial microparticles occurs, solidification of the binder is reduced.

In addition, the content of the compound having a siloxane bond is 60% by mass or more with respect to the total solid content of the antibacterial liquid. The abundance of a siloxane component in an antibacterial film formed using such antibacterial liquid is significantly greater than those of other components in the film, and therefore, the number of voids in a network formed by the siloxane bonds (for example, a region where siloxane is not present) is small. In a case in which there are many voids in the network, and the antibacterial film is exposed to, for example, a weak alkali liquid, an $OH^-$ ion in the weak alkali liquid easily penetrates inside the film through the void in the siloxane network, that is, the contact frequency between the $OH^-$ ion and the film increases. As a result, the $OH^-$ ion breaks the siloxane bond, and therefore, a three-dimensional structure of the siloxane is destructed from the inside and the outside, causing peeling of the film or the like, whereby the antibacterial microparticles supported by the siloxane are damaged.

Since the number of voids in the network is small in the antibacterial film formed using the antibacterial liquid of the invention, damage on the antibacterial microparticles due to the peeling of the film or the like is reduced, and the antibacterial properties can be maintained over a long period of time.

Hereinafter, each of the components included in the antibacterial liquid of the invention will be described in detail.

[Antibacterial Microparticles]

The antibacterial microparticles contain at least a silver-supporting inorganic oxide.

<Silver-Supporting Inorganic Oxide>

The silver-supporting inorganic oxide has silver, and an inorganic oxide serving as a support that supports this silver.

Regarding the silver (silver atoms), there are no particular limitations on the type of silver. The form of silver is also not particularly limited, and for example, silver is incorporated in the form of metal silver, silver ion, or a silver salt (including a silver complex). According to the present specification, a silver complex is included in the scope of silver salts.

Examples of the silver salt include silver acetate, silver acetylacetonate, silver azide, silver acetylide, silver arsenate, silver benzoate, silver hydrogen fluoride, silver bromate, silver bromide, silver carbonate, silver chloride, silver chlorate, silver chromate, silver citrate, silver cyanate, silver cyanide, silver (cis, cis-1,5-cyclooctadiene)-1,1,1,5,5,5-hexafluoroacetyl acetonate, silver diethyldithiocarbamate, silver(I) fluoride, silver(II) fluoride, silver 7,7-dimethyl-1,1,1,2,2,3,3-heptafluoro-4,6-octanedionate, silver hexafluoroantimonate, silver hexafluoroarsenate, silver hexafluorophosphate, silver iodate, silver iodide, silver isothiocyanate, potassium silver cyanide, silver lactate, silver molybdate, silver nitrate, silver nitrite, silver(I) oxide, silver(II) oxide, silver oxalate, silver perchlorate, silver perfluorobutyrate, silver perfluoropropionate, silver permanganate, silver perrhenate, silver phosphate, silver picrate monohydrate, silver propionate, silver selenate, silver selenide, silver selenite, sulfadiazine silver, silver sulfate, silver sulfide, silver sulfite, silver telluride, silver tetrafluoroborate, silver tetraiodomercurate, silver tetratungstate, silver thiocyanate, silver p-toluenesulfonate, silver trifluoromethanesulfonate, silver trifluoroacetate, or silver vanadate.

Examples of the silver complex include a histidine-silver complex, a methionine-silver complex, a cysteine-silver complex, an aspartic acid-silver complex, a pyrrolidone carboxylic acid-silver complex, an oxotetrahydrofurancarboxylic acid-silver complex, or an imidazole-silver complex.

Meanwhile, examples of the inorganic oxide as a support include zinc calcium phosphate, calcium phosphate, zirconium phosphate, aluminum phosphate, calcium silicate, activated carbon, activated alumina, silica gel, glass (silicon oxide), zeolite, apatite, hydroxyapatite, titanium phosphate, potassium titanate, hydrous bismuth oxide, hydrous zirconium oxide, and hydrotalcite.

Suitable examples of such a silver-supporting inorganic oxide include silver-supporting zeolite, silver-supporting apatite, silver-supporting glass, silver-supporting zirconium phosphate, and silver-supporting calcium silicate. Among them, silver-supporting apatite and silver-supporting glass are preferred, and silver-supporting glass is more preferred.

The antibacterial microparticles may also contain an antibacterial agent other than the silver-supporting inorganic oxide, and examples thereof include an organic antibacterial agent, and an inorganic antibacterial agent that does not contain silver.

Examples of the organic antibacterial agent include a phenol ether derivative, an imidazole derivative, a sulfone derivative, an N-haloalkylthio compound, an anilide derivative, a pyrrole derivative, a quaternary ammonium salt, a pyridine-based compound, a triazine-based compound, a benzisothiazoline-based compound, and an isothiazoline-based compound.

Examples of the inorganic antibacterial agent that does not contain silver include antibacterial agents having a metal such as copper or zinc supported on the above-mentioned supports.

The antibacterial microparticles may be in the form of microparticles containing an antibacterial agent other than the silver-supporting inorganic oxide, or may also be in the form of microparticles substantially formed from a silver-supporting inorganic oxide only.

The content of the silver-supporting inorganic oxide in the antibacterial microparticles is, as solid content, preferably 60% by mass or more, more preferably 70% by mass or more, and even more preferably 95% by mass or more.

<Average Particle Size of Antibacterial Microparticles>

The average particle size of the antibacterial microparticles is, for example, 0.01 to 2.0 μm. Here, in a case in which the size of the particles is too small, and the antibacterial film is formed under the condition in which the particles are exposed, the film becomes extremely thin, and thus the film becomes weak, whereas in a case in which the size of the particles is too big, the sedimentation property of the antibacterial liquid becomes greater. Therefore, the average particle size of the antibacterial microparticles is preferably 0.05 μm or greater and less than 1.0 μm, and more preferably 0.1 to 0.7 μm.

According to the invention, the average particle size is obtained by measuring the 50% volume cumulative diameter (D50) three times using a laser diffraction/scattering type particle size distribution analyzer manufactured by Horiba, Ltd., and the average value of the values obtained by measuring three times is used.

The average particle size of the antibacterial microparticles can be regulated by a conventionally known method, and for example, dry pulverization or wet pulverization can be employed. In regard to dry pulverization, for example, a mortar, a jet mill, a hammer mill, a pin mill, a rotary mill, a vibratory mill, a planetary mill, a beads mill, or the like is used as appropriate. Furthermore, in regard to wet pulverization, various ball mills, a high-speed rotating pulverizer, a jet mill, a beads mill, an ultrasound homogenizer, a high-pressure homogenizer, or the like is used as appropriate.

For example, in regard to a beads mill, the average particle size can be controlled by regulating the diameter, kind, mixing amount, or the like of the beads that serve as media.

According to the invention, for example, the average particle size of the antibacterial microparticles can be regulated by wet pulverization by dispersing the antibacterial microparticles as an object of pulverization in ethanol or water, and mixing and vibrating zirconia beads having different sizes. However, the method is not limited to this method, and any appropriate method for controlling the particle size may be selected.

<Content of Antibacterial Microparticles>

The content of the antibacterial microparticles with respect to the total mass of the antibacterial liquid of the invention is, as solid content, preferably 1.0% by mass or less, more preferably 0.4% by mass or less, and even more preferably 0.3% by mass or less. The lower limit is not particularly limited; however, for example, the lower limit is 0.001% by mass or more.

In addition, the content of the antibacterial microparticles with respect to the total solid content mass in the antibacterial liquid of the invention is, as solid content, preferably 25% by mass or less, more preferably 22% by mass or less, even more preferably 21% by mass or less, and particularly preferably 18% by mass or less. The lower limit is not particularly limited; however, for example, the lower limit is 0.1% by mass or more.

The content of silver in the antibacterial microparticles is not particularly limited; however, the content is, for example, 0.1% to 30% by mass, and preferably 0.3% to 10% by mass, with respect to the total mass of the antibacterial microparticles.

[Binder]

The binder includes at least one compound having a siloxane bond. Examples of the binder include a partial condensate of a silane compound, silica particles, or the like. It is preferable that the binder exhibits hydrophilicity.

<Partial Condensate of Silane Compound>

The partial condensate of a silane compound is a compound having a siloxane bond in the structure thereof by partial hydrolytic condensation of a silane compound having a hydrolyzable group or a hydroxyl group. Regarding the hydrolyzable group, from the viewpoint of obtaining an antibacterial film exhibiting hydrophilicity and having excellent antibacterial properties, for example, a partial condensate of a silane compound having an alkoxy group having 1 to 6 carbon atoms, such as a methoxy group or an ethoxy group is more preferable, and a siloxane compound (siloxane oligomer) represented by General Formula (1) is even more preferable.

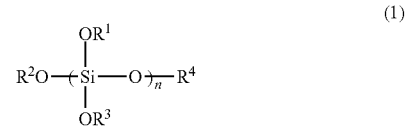

Here, in General Formula (1), $R^1$ to $R^4$ each independently represent an organic group having 1 to 6 carbon atoms. n represents an integer from 2 to 100.

In General Formula (1), $R^1$ to $R^4$ each independently represent an organic group having 1 to 6 carbon atoms. $R^1$ to $R^4$ may be respectively identical with or different from each other. $R^1$ to $R^4$ may be any one of linear, branched, and cyclic. The organic group represented by $R^1$ to $R^4$ is preferably an alkyl group having 1 to 6 carbon atoms. Examples of the alkyl group represented by $R^1$ to $R^4$ include a methyl group, an ethyl group, a propyl group, an isopropyl group, an n-butyl group, a tert-butyl group, an n-pentyl group, an n-hexyl group, or a cyclohexyl group. By adjusting the number of carbon atoms of the alkyl group represented by $R^1$ to $R^4$ to 1 to 6, the hydrolyzability of the siloxane oligomer can be increased. In view of the ease of hydrolysis, the organic group represented by $R^1$ to $R^4$ is more preferably an alkyl group having 1 to 4 carbon atoms, and even more preferably an alkyl group having 1 or 2 carbon atoms.

In General Formula (1), n is preferably an integer from 2 to 20. By adjusting n to be within this range, the viscosity of a solution including the hydrolysate can be adjusted to an appropriate range, and the reactivity of the siloxane oligomer can be controlled to be in a preferred range. In a case in which n is greater than 20, the viscosity of a solution including the hydrolysate of the siloxane oligomer increases too high, and handling may be difficult. On the other hand, in a case in which n is 1, control of the reactivity of the alkoxysilane is difficult, and it may be difficult to exhibit hydrophilicity after coating. n is preferably 3 to 15, and more preferably 5 to 10.

The siloxane oligomer is brought to a state in which at least a portion thereof is hydrolyzed, as the siloxane oligomer is mixed together with an aqueous component. A hydrolysate of a siloxane oligomer is obtained by reacting the siloxane oligomer with an aqueous component, and changing the alkoxy group bonded to a silicon atom to a hydroxyl group. On the occasion of hydrolysis, it is not necessarily essential that all alkoxy groups react; however, in order to exhibit hydrophilicity after coating, it is preferable that as many alkoxy groups as possible are hydrolyzed. The amount of the aqueous component needed at the minimum on the occasion of hydrolysis is an amount equimolar to that of the alkoxy groups of the siloxane oligomer; however, in order to carry out the reaction smoothly, it is preferable that a large excess of water is present.

This hydrolysis reaction proceeds at room temperature; however, the reaction system may be heated for accelerating the reaction. It is preferable that the reaction time is longer, because the reaction may proceed further. Furthermore, it is also possible to obtain a hydrolysate for a time period of about half a day in a case in which the catalyst that will be described below is present.

The hydrolysis reaction is a reversible reaction, and as water is excluded from the system, the hydrolysate of the siloxane oligomer initiates condensation between hydroxyl groups. Therefore, in a case in which an aqueous solution of the hydrolysate is obtained by reacting the siloxane oligomer with a large excess of water, it is preferable to use the hydrolysate in the form of an aqueous solution, without forcibly isolating the hydrolysate from the aqueous solution.

The antibacterial liquid of the invention includes water as a solvent; however, as an aqueous component is used as a solvent, the burden on the health of the operator at the time of handling and the burden on the environment are reduced, and also, the hydrolysate of the siloxane oligomer being condensed in the liquid during storage can be suppressed.

Regarding the siloxane oligomer represented by General Formula (1), a commercially available product can be used, and specific examples thereof include MKC (registered trademark) SILICATE manufactured by Mitsubishi Chemical Corporation.

<Silica Particles>

The shape of the silica particles is not particularly limited, and examples thereof include a spherical shape, a plate shape, a needle shape, and a necklace shape; however, a spherical shape is preferred. Furthermore, it is acceptable that the silica particles have silica as the shell, and have air and/or an organic resin in the core. The surface of the silica particles may also be subjected to a surface treatment for the purpose of dispersion stabilization.

The average particle size (primary particle size) of the silica particles is preferably 100 nm or less, more preferably 50 nm or less, and even more preferably 30 nm or less. The particle size of the silica particles can be measured in the same manner as in the case of the antibacterial microparticles described above. Two or more kinds of silica particles having different shapes or sizes can be used in combination.

Regarding the silica particles, a commercially available product can be used, and specific examples thereof include QSG-30 manufactured by Shin-Etsu Chemical Co., Ltd.

The silica particles have the effect of allowing the antibacterial film formed using the antibacterial liquid of the invention to exhibit hydrophilicity, while increasing the physical resistance thereof. That is, the silica particles accomplish the role as a hard filler, and also contribute to hydrophilicity by means of the hydroxyl groups on the surface of the silica particles.

The binder may include a binder other than the above-mentioned compound having a siloxane bond, or may substantially include the above-mentioned compound having a siloxane bond only.

The content of the compound having a siloxane bond in the binder is preferably 70% by mass or more, more preferably 80% by mass or more, even more preferably 90% by mass or more, and most preferably 100% by mass.

<Content of Compound Having Siloxane Bond>

The content of the compound having a siloxane bond with respect to the total solid content mass of the antibacterial liquid of the invention is 60% by mass or more, more preferably 70% by mass or more, even more preferably 80% by mass or more, and particularly preferably 85% by mass or more. The upper limit is not particularly limited; however, for example, the upper limit is 99% by mass or less.

The content of the binder with respect to the total mass of the antibacterial liquid of the invention is preferably 10% by mass or less, more preferably 5% by mass or less, and even more preferably 4% by mass or less.

[Solvent]

The solvent includes an alcohol and water. Water is not particularly limited, and for example, pure water may be used.

The alcohol is preferable because the alcohol annihilates a wide variety of microorganisms in a short time period.

There are no particular limitations on the alcohol; however, for example, a chain-like lower hydrocarbon alcohol (hereinafter, "lower alcohol") or a chain-like higher hydrocarbon alcohol (hereinafter, "higher alcohol") may be used. Suitable examples of the lower alcohol include a lower alcohol having 1 to 6 carbon atoms, and specific examples thereof include methanol, ethanol, n-propanol, isopropanol, n-butanol, 2-butanol, i-butanol, t-butanol, n-pentanol, t-amyl alcohol, or n-hexanol. Suitable examples of the higher alcohol include a higher alcohol having 7 or more carbon atoms (preferably 7 to 15 carbon atoms), and specific examples thereof include capryl alcohol, lauryl alcohol, or myristyl alcohol.

Examples of the alcohol other than those described above include phenyl ethyl alcohol, ethylene glycol, ethylene glycol mono-n-butyl ether, diethylene glycol mono-n-butyl ether, triethylene glycol mono-n-butyl ether, tetraethylene glycol mono-n-butyl ether, or dipropylene glycol monobutyl ether.

These may be used singly, or two or more kinds thereof may be used in combination.

Among these, methanol, ethanol, isopropanol, butanol, or n-propanol is preferable, and ethanol, methanol, or isopropanol is more preferable.

From the viewpoint of further suppressing sedimentation, the content of the alcohol with respect to the total mass of the antibacterial liquid of the invention is 10% by mass or more, preferably 45% by mass or more, more preferably 50% by mass or more, and even more preferably 55% by mass or more. The upper limit is not particularly limited; however, the upper limit is, for example, 99% by mass or less.

The content of the alcohol in the solvent is, for example, 5% to 100% by mass, and more preferably 40% to 95% by mass.

The solvent may also include another hydrophilic organic solvent apart from an alcohol. Examples of the other hydrophilic organic solvent include benzole, toluole, methyl ethyl ketone (MEK), acetone, a 10% denatonium benzoate alcohol solution, ethyl acetate, hexane, ethyl ether, geraniol, 8-acetylated sucrose, brucine, linalool, linalyl acetate, acetic acid, or butyl acetate.

In a case in which another hydrophilic organic solvent is included in the solvent in addition to an alcohol, the content of the other hydrophilic organic solvent in the solvent apart from an alcohol is, for example, preferably 20% by mass or less.

According to the invention, diluents (water, an alcohol, and the like) of each of the components are also included in the solvent.

[Fragrance]

The antibacterial liquid of the invention may include a fragrance.

As the fragrance, a flavor H-1, H-2, H-3, H-4, H-6, H-9, H-10, H-11, H-12, H-13, or H-14 manufactured by T. HASEGAWA CO., LTD, a flavor T-100, T-101, T-102, T-103, T-104, T-105, T-106, T-107, or EDA-171 manufactured by Takasago International Corporation, a flavor S-201 manufactured by SODA AROMATIC Co., Ltd., a flavor DA-40 manufactured by RIKEN PERFUMERY HOLDINGS CO., Ltd., or the like may be included.

The content of the fragrance with respect to the total mass of the antibacterial liquid of the invention is preferably 0.01% by mass to 5% by mass.

[Dispersant]

The antibacterial liquid of the invention may include a dispersant, from the viewpoint of increasing the dispersibility of the above-mentioned antibacterial microparticles and further suppressing sedimentation. As the dispersant, a nonionic or anionic dispersant is preferably used. From the viewpoint of the affinity to the antibacterial microparticles, for example, a dispersant having an anionic polar group such as a carboxyl group, a phosphoric acid group, or a hydroxyl group (anionic dispersant) is more preferred.

Regarding the anionic dispersant, a commercially available product can be used, and specific suitable examples thereof include trade name DISPERBYK (registered trademark)-110, -111, -116, -140, -161, -162, -163, -164, -170, -171, -174, -180, or -182 of BYK-Chemie GmbH.

The content of the dispersant (particularly, anionic dispersant) is, as solid content, for example, 50% by mass or more with respect to the content of the antibacterial microparticles, and for the reason that sedimentation is further suppressed, the content is preferably 200% by mass or more, and more preferably 400% by mass or more. Meanwhile, the upper limit is not particularly limited; however, for example, the upper limit is 1,500% by mass or less.

[Catalyst]

In a case in which the antibacterial liquid of the invention includes the above-mentioned siloxane oligomer as a binder, it is preferable that the antibacterial liquid further includes a catalyst that accelerates condensation thereof. By applying the antibacterial liquid of the invention, and then eliminating moisture therefrom by drying the applied liquid, (at least a portion of) the hydroxyl groups carried by the hydrolysate of the siloxane oligomer are condensed with each other to form bonds, and a stable coating film (antibacterial film) is obtained. At this time, the formation of the antibacterial film can be made to proceed more rapidly by incorporating a catalyst that accelerates condensation of the siloxane oligomer.

There are no particular limitations on the catalyst that accelerates condensation of the siloxane oligomer; however, examples thereof include an acid catalyst, an alkali catalyst, or an organometallic catalyst. Examples of the acid catalyst include nitric acid, hydrochloric acid, sulfuric acid, acetic acid, chloroacetic acid, formic acid, oxalic acid, or toluenesulfonic acid. Examples of the alkali catalyst include sodium hydroxide, potassium hydroxide, or tetramethylammonium hydroxide. Examples of the organometallic catalyst include aluminum chelate compounds such as aluminum bis(ethyl acetoacetate) mono(acetylacetonate), aluminum tris(acetylacetonate), or aluminum ethyl acetoacetate diisopropylate; zirconium chelate compounds such as zirconium tetrakis (acetylacetonate) or zirconium bis(butoxy) bis(acetylacetonate); titanium chelate compounds such as titanium tetrakis (acetylacetonate) and titanium bis(butoxy) bis (acetylacetonate); and organotin compounds such as dibutyltin diacetate, dibutyltin dilaurate, or dibutyltin dioctoate.

Among these, an organometallic catalyst is preferred, and an aluminum chelate compound or a zirconium chelate compound is more preferred.

The content of the catalyst that accelerates the condensation of the siloxane oligomer is, as solid content, preferably 0.1% to 20% by mass, more preferably 0.2% to 15% by mass, and even more preferably 0.3% to 10% by mass, with respect to the total solid content mass of the antibacterial liquid of the invention.

The catalyst that accelerates the condensation of the siloxane oligomer is also useful for the hydrolysis of the siloxane oligomer.

[Surfactant]

The antibacterial liquid of the invention may also include a surfactant (component that exhibits interface activity). Thereby, coatability can be increased, and the surface tension is decreased so that more uniform coating is enabled.

Regarding the surfactant, a nonionic surfactant and an ionic (anionic, cationic, or amphoteric) surfactant can all be suitably used. In a case in which an ionic surfactant is added in excess, the amount of electrolyte in the system increases, and aggregation of silica microparticles and the like may be brought about. Therefore, in the case of using an ionic surfactant, it is preferable that the antibacterial liquid further includes a nonionic component that exhibits interface activity.

Examples of the nonionic surfactant include polyalkylene glycol monoalkyl ethers, polyalkylene glycol monoalkyl esters, or polyalkylene glycol monoalkyl ester/monoalkyl ethers. More specific examples include polyethylene glycol monolauryl ether, polyethylene glycol monostearyl ether, polyethylene glycol monocetyl ether, polyethylene glycol monolauryl ester, or polyethylene glycol monostearyl ester.

Examples of the ionic surfactant include anionic surfactants such as an alkyl sulfate, an alkyl benzenesulfonate, and an alkyl phosphate; cationic surfactants such as an alkyl trimethylammonium salt and a dialkyl dimethylammonium salt; and amphoteric surfactants such as an alkylcarboxybetaine.

The content of the surfactant with respect to the total mass of the antibacterial liquid of the invention is, as solid content, for example, 0.001% by mass or more, preferably 0.005% by mass or more, and more preferably 0.01% by mass or more.

Meanwhile, the content of the surfactant with respect to the total solid content mass of the antibacterial liquid of the invention is, as solid content, preferably 10% by mass or less, more preferably 7% by mass or less, and even more preferably 5% by mass or less.

The content of the total solid content mass with respect to the total mass of the antibacterial liquid of the invention is less than 5% by mass, and more preferably 4.5% by mass or less. The lower limit is not particularly limited; however, the lower limit is, for example, 0.1% by mass or more.

[Method for Producing Antibacterial Liquid]

The antibacterial liquid of the invention can further include other additives (for example, a preservative, a deodorizing agent, or a fragrance) as necessary, to the extent that the purpose of the invention is not impaired.

The antibacterial liquid of the invention is obtained by appropriately mixing the above-mentioned essential components and optional components.

[pH of Antibacterial Liquid]

The pH of the antibacterial liquid of the invention is not particularly limited; however; in a case in which rough handling of the user in an actual use environment or the like is considered, it is preferable to adjust the pH to an appropriate range.

The pH of the antibacterial liquid of the invention is preferably 3 to 10, and more preferably 4 to 9.

According to the invention, the pH is measured using a pH meter; HM-30R, manufactured by DKK-Toa Corporation.

[Specific Gravity of Antibacterial Liquid]

The specific gravity of the antibacterial liquid of the invention is not particularly limited; however, the specific gravity is preferably 0.5 to 1.2.

[Antibacterial Film]

Hereinafter, the antibacterial film (coating film) formed using the antibacterial liquid of the invention will be described.

The antibacterial film is formed by, for example, coating a base material with the antibacterial liquid of the invention and drying the antibacterial liquid.

Due to the above-mentioned composition of the antibacterial liquid, it is preferable that the antibacterial film of the invention has resistance in a solution having a pH of 11 or lower, such that the film is not removable in the solution. Here, the film having resistance in a solution having a pH of 11 or lower, such that the film is not removable in the solution, indicates that the water contact angle (unit: °) of the film is smaller than 90°, in a case in which the antibacterial film is wiped with a member (for example, a non-woven fabric) impregnated with a remover liquid (for example, a liquid obtained by dissolving NaOH in pure water) of which the pH has been adjusted to the above pH.

In addition, it is possible to impart resistance to the film in a solution having a pH of preferably 11.5 or lower and more preferably a pH of 12.5 or lower such that the film is not removable in the solution, by adjusting the amount of the compound having a siloxane bond with respect to the total solid content in the antibacterial liquid.

The material constituting the base material on which the antibacterial liquid of the invention is applied is not particularly limited, and glass, a resin, a metal, a ceramic, wood, pottery, a fabric, or the like is used as appropriate.

Examples of the resin include polypropylene, polystyrene, a polyurethane, an acrylic resin, a polycarbonate, a polyamide, a fluororesin, a latex, polyvinyl chloride, a polyolefin, a melamine resin, an ABS (acrylonitrile-butadiene-styrene) resin, or a polyester (for example, polyethylene terephthalate (PET)).

Examples of the metal include SUS or brass.

Examples of the fabric include a fabric formed of a material such as polyester.

Examples of the wood include plain wood (raw wood) or coated wood (for example, wood of which the surface is varnished).

The shape of the base material is not particularly limited, and examples thereof include a plate form, a film form, and a sheet form. The base material surface may be a flat surface, a concave surface, or a convex surface. Furthermore, a conventionally known easily adhesive layer may also be formed on the surface of the base material.

The method for applying the antibacterial liquid of the invention is not particularly limited, and examples thereof include a spraying method, a brush coating method, an immersion method, an electrostatic coating method, a bar coating method, a roll coating method, a flow coating method, a die coating method, a nonwoven fabric coating method, an inkjet method, a casting method, a rotary coating method, or a Langmuir-Blodgett (LB) method.

Regarding the drying performed after the application, drying may be performed at room temperature, or drying may be performed by heating to a temperature of preferably 50° C. to 120° C. and more preferably 40° C. to 120° C. The drying time is, for example, about 1 to 30 minutes. In the case of drying, the humidity is preferably 20% to 90% RH.

[Water Contact Angle of Antibacterial Film]

The water contact angle of the surface of the antibacterial film is preferably 60° or lower. By setting the water contact angle within this numerical range, the antibacterial film has excellent removability of contaminants by washing or the like (antifouling properties), and also exhibits hydrophilicity and excellent antibacterial properties.

Since the antibacterial film exhibits hydrophilicity, moisture can easily permeate into the antibacterial film, and moisture also reaches the antibacterial microparticles (silver-supporting inorganic oxide) in the antibacterial film, so that silver ions can be released. Thus, it is speculated that the antibacterial microparticles in the antibacterial film can also be effectively utilized thereby, and the supply of silver can be continued, so that satisfactory antibacterial properties are obtained.

The lower limit of the water contact angle is not particularly limited; however, for example, the lower limit is 5° or higher in many cases.

According to the invention, the water contact angle is measured based on the sessile drop method of JIS R3257: 1999. For the measurement, FAMMS DM-701 manufactured by Kyowa Interface Science Co., Ltd. is used. More specifically, 2 µL of liquid droplets are added dropwise using pure water on an antibacterial film surface that is maintained horizontally, at room temperature of 20° C., and at the time point of 20 seconds after the dropwise addition, the contact angle is measured at 10 sites. The average value of the measurement results is designated as the contact angle.

[Film Thickness of Antibacterial Film]

In a case in which the average particle size of the antibacterial microparticles included in the antibacterial liquid is smaller than the film thickness of the antibacterial film thus formed, the antibacterial microparticles are embedded therein, and the antibacterial properties are not easily manifested.

As described above, in a case in which the antibacterial microparticles are embedded in the antibacterial film, the antibacterial properties are not easily manifested. Therefore, it is preferable that the antibacterial microparticles are disposed in a convex shape (the antibacterial microparticles protrude from the surface of the antibacterial film). Specifically, the ratio (X/Y) of the average particle size X of the antibacterial microparticles with respect to the film thickness Y is preferably 1 or greater, and more preferably 2 or greater.

The film thickness of the antibacterial film is not particularly limited; however, it is preferable that the film thickness is set such that (X/Y) is 1 or greater as described above, based on the average particle size of the antibacterial microparticles.

According to the invention, the film thickness is determined as follows. First, a sample specimen of an antibacterial film is embedded in a resin, cross-sections are sliced off with a microtome, and the cross-sections thus sliced are observed with a scanning electron microscope. The film thicknesses at any arbitrary ten positions of the antibacterial film are measured, and the value obtained by arithmetically averaging the film thicknesses is designated as the film thickness (average film thickness) of the antibacterial film.

[Silver Content in Antibacterial Film]

The silver content in the antibacterial film is set such that the density of silver ions per unit area of the antibacterial film, which is measured by the following extraction experiment, is preferably $1\times10^{-6}$ g/m$^2$ to $1\times10^{-3}$ g/m$^2$ and more preferably $1\times10^{-5}$ g/m$^2$ to $1\times10^{-4}$ g/m$^2$.

Extraction condition: A 1/500 normal nutrient broth medium specified in JIS Z 2801:2010 was used as an extraction liquid, the temperature of the extraction liquid was controlled to 35±1° C., and the surface of the antibacterial film and the extraction liquid were brought into contact with each other for 1 hour, so as to measure the amount of silver ions extracted in the extraction liquid. The obtained value was divided by the contact area between the surface of the antibacterial film and the extraction liquid, thus obtaining the amount of silver ions per unit area. The unit of the amount of silver ions is g, the unit of the contact area is m$^2$, and the unit of the amount of silver ions per unit area is g/m$^2$.

[Use Applications]

The antibacterial film formed using the antibacterial liquid of the invention itself can be used as an antibacterial sheet. Regarding the method of disposing an antibacterial film (antibacterial sheet) in various apparatuses, for example, an antibacterial film may be formed by directly applying the antibacterial liquid of the invention on the surface (front face) of an apparatus, or an antibacterial film may be separately formed and adhered to the surface of an apparatus, with a pressure sensitive adhesive layer or the like being disposed therebetween.

An antibacterial film-attached base material can also be used as a front face plate of various apparatuses.

Examples of apparatuses in which an antibacterial film (antibacterial sheet) and an antibacterial film-attached base material are used include a radiographic imaging apparatus or a touch panel.

In addition to that, examples of places where the antibacterial liquid of the invention is directly applied in order to suppress cross-infection in medical settings, include walls, ceilings, floors, door knobs, banisters, switches, buttons, or toilet seats in facilities such as hospitals and nursing facilities. Furthermore, since the antibacterial film formed by applying the antibacterial liquid of the invention has superior hydrophilicity, in a case in which contaminants (for example, contaminants such as blood and body fluids) in medical settings adhere to the antibacterial film, the contaminants can be removed simply by mopping up.

[Spray and Cloth (Fabric)]

The antibacterial liquid of the invention can be made into a portable article. For example, the antibacterial liquid of the invention may be used by filling a spray with the antibacterial liquid, or may be used as a cleaning sheet obtained by wetting a cloth (fabric) with the antibacterial liquid.

[Spray]

The spray of the invention contains the antibacterial liquid of the invention. Specifically, the spray can be formed by filling a predetermined vessel with the antibacterial liquid of the invention and a propellant. The propellant that can be used is not particularly limited, and examples thereof include liquefied petroleum gas.

[Cloth]

The cloth (fabric) of the invention contains the antibacterial liquid of the invention. Specifically, the cloth (fabric) of the invention can be formed by wetting a cloth (fabric) such as a nonwoven fabric, a woven fabric, or cotton, and the like with the antibacterial liquid of the invention.

EXAMPLES

Hereinafter, the invention will be described in more detail based on Examples. Materials, used amounts, proportions, treatment contents, treatment procedures, and the like in the following Examples can be suitably changed within the gist of the present invention. Therefore, the range of the present invention will not be restrictively interpreted by the following Examples.

Example 1

While 170 g of ethanol was stirred in a vessel, 100 g of pure water, 3.7 g of a siloxane compound as a binder ("MKC (registered trademark) SILICATE MS51" manufactured by Mitsubishi Chemical Corporation), 15 g of ALUMINUM CHELATE D (aluminum bis(ethyl acetoacetate) mono (acetylacetonate), ethanol dilution; concentration of solid contents: 1% by mass), 60 g of a nonionic surfactant ("EMALEX 715" manufactured by Nihon Emulsion Co., Ltd., pure water dilution; concentration of solid contents: 0.5% by mass), and 10 g of an anionic surfactant (sodium di(2-ethylhexyl)sulfosuccinate, pure water dilution; concentration of solid contents: 0.2% by mass) were sequentially added to the vessel. Subsequently, 2.2 g of antibacterial microparticles (silver-supporting glass, manufactured by Fuji Chemical Industries Co., Ltd., ethanol dilution; concentration of solid contents: 50% by mass) having the average particle size controlled to be 0.6 μm were added to the vessel, and the mixture was stirred for 20 minutes. Thus, Antibacterial Liquid A-1 was obtained.

The average particle size of the antibacterial microparticles was regulated in advance by wet pulverization, by mixing the antibacterial microparticles with zirconia beads and vibrating the mixture using a beads mill (hereinafter, the same applies in Examples 2 to 11 and Comparative Examples 1 to 3).

An inner surface of a commercially available resin wash basin was coated with the antibacterial liquid A-1 by impregnating a nonwoven fabric ("BEMCOT M-3II" manufactured by Asahi Kasei Corporation) with the antibacterial liquid A-1 and using the nonwoven fabric as a wet wipe to spread the antibacterial liquid over the inner surface of the wash basin. The antibacterial liquid was dried at room temperature for 20 minutes, and thus, an antibacterial film B-1 was obtained as a coating film.

Example 2

An antibacterial liquid A-2 and an antibacterial film B-2 which was a coating film of the antibacterial liquid A-2 were obtained using the same method as in Example 1, except that the amount of the siloxane compound serving as the binder ("MKC (registered trademark) SILICATE MS51" manufactured by Mitsubishi Chemical Corporation) was changed to 4.8 g.

Example 3

An antibacterial liquid A-3 and an antibacterial film B-3 which was a coating film of the antibacterial liquid A-3 were obtained using the same method as in Example 1, except that the amount of the siloxane compound serving as the binder ("MKC (registered trademark) SILICATE MS51" manufactured by Mitsubishi Chemical Corporation) was changed to 6.1 g.

Example 4

An antibacterial liquid A-4 and an antibacterial film B-4 which was a coating film of the antibacterial liquid A-4 were obtained using the same method as in Example 1, except that the amount of the siloxane compound serving as the binder ("MKC (registered trademark) SILICATE MS51" manufactured by Mitsubishi Chemical Corporation) was changed to 14 g.

Example 5

An antibacterial liquid A-5 and an antibacterial film B-5 which was a coating film of the antibacterial liquid A-5 were obtained using the same method as in Example 1, except that the amounts of the ethanol and the pure water introduced into the vessel were changed from 170 g and 100 g to 425 g and 250 g, respectively.

Example 6

An antibacterial liquid A-6 and an antibacterial film B-6 which was a coating film of the antibacterial liquid A-6 were obtained using the same method as in Example 1, except that 160 g of ethanol and 10 g of methanol were introduced into the vessel instead of 170 g of ethanol.

Example 7

An antibacterial liquid A-7 and an antibacterial film B-7 which was a coating film of the antibacterial liquid A-7 were obtained using the same method as in Example 1, except that 153 g of ethanol and 17 g of isopropanol were introduced into the vessel instead of 170 g of ethanol.

Example 8

An antibacterial liquid A-8 and an antibacterial film B-8 which was a coating film of the antibacterial liquid A-8 were obtained using the same method as in Example 1, except that 160 g of ethanol and 10 g of methylethylketone were introduced into the vessel instead of 170 g of ethanol.

Example 9

An antibacterial liquid A-9 and an antibacterial film B-9 which was a coating film of the antibacterial liquid A-9 were obtained using the same method as in Example 1, except that 0.7 g of silica particles ("QSG-30" manufactured by Shin-Etsu Chemical Co., Ltd., average particle size of 30 nm) were additionally introduced into the vessel.

Example 10

An antibacterial liquid A-10 and an antibacterial film B-10 which was a coating film of the antibacterial liquid A-10 were obtained using the same method as in Example 2, except that the amount of the ethanol introduced into the vessel was changed from 170 g to 169.2 g, and 0.8 g of a fragrance ("EDA-171" manufactured by Takasago International Corporation) were additionally introduced into the vessel.

Example 11

An antibacterial liquid A-11 and an antibacterial film B-11 which was a coating film of the antibacterial liquid A-11 were obtained using the same method as in Example 1, except that the amounts of the ethanol and the pure water introduced into the vessel were changed from 170 g and 100 g to 17 g and 10 g, respectively, and the average particle size of the antibacterial microparticles (silver-supporting glass, manufactured by Fuji Chemical Industries Co., Ltd., ethanol dilution; concentration of solid contents: 50% by mass) was changed from 0.6 μm to 3.0 μm.

Comparative Example 1

An antibacterial liquid A-12 and an antibacterial film B-12 which was a coating film of the antibacterial liquid A-12 were obtained using the same method as in Example 1, except that the used amount of the siloxane compound serving as the binder ("MKC (registered trademark) SILICATE MS51" manufactured by Mitsubishi Chemical Corporation) was changed from 3.7 g to 1.6 g.

Comparative Example 2

An antibacterial liquid A-13 and an antibacterial film B-13 which was a coating film of the antibacterial liquid A-13 were obtained using the same method as in Example 1, except that the used amount of the siloxane compound serving as the binder ("MKC (registered trademark) SILICATE MS51" manufactured by Mitsubishi Chemical Corporation) was changed from 3.7 g to 1.0 g.

Comparative Example 3

An antibacterial liquid A-14 and an antibacterial film B-14 which was a coating film of the antibacterial liquid A-14 were obtained using the same method as in Example 1, except that the amounts of the ethanol and the pure water introduced into the vessel were changed from 170 g and 100 g to 17 g and 10 g, respectively, and the used amount of the siloxane compound serving as the binder ("MKC (registered trademark) SILICATE MS51" manufactured by Mitsubishi Chemical Corporation) was changed from 3.7 g to 10 g.

<Evaluation>

The following evaluation was performed for each of the antibacterial liquids A-1 to A-14 and each of the antibacterial films B-1 to B-13. The results are shown in Table 1.

(Evaluation of Temporal Stability of Antibacterial Liquid)

The antibacterial liquids prepared in Examples and Comparative Examples were put into a glass bottle with a cap, the liquids were left to stand at room temperature for 3 weeks, and whether caking occurs or not was evaluated based on the following criteria.

"A": There is no change in the properties of the liquid.

"B": Floating matter is generated, but upon shaking of the bottle, the floating matter redisperses.

"C": Solid components sediment at the bottom of the bottle and did not redisperse even in a case in which the bottle is shaken.

(Water Contact Angle of Antibacterial Film)

Regarding the antibacterial films prepared in Examples and Comparative Examples, water contact angles were measured using the following method.

The water contact angle is measured based on the sessile drop method of JIS R3257:1999. For the measurement, FAMMS DM-701 manufactured by Kyowa Interface Science Co., Ltd. is used. More specifically, 2 μL of liquid droplets are added dropwise using pure water on an antibacterial film surface that is maintained horizontally, at room temperature of 20° C., and at the time point of 20 seconds after the dropwise addition, the contact angle is measured at 10 sites. The average value of the measurement results is designated as the contact angle.

For practical use, it is preferable that the water contact angle is 60° C. or less.

(Measurement of pH at which Film can be Removed)

The remover liquid of which the pH has been adjusted (an alkali solution which is obtained by dissolving NaOH in pure water and of which the pH has been adjusted to a predetermined pH) was infiltrated into a commercially available wipe (nonwoven fabric ("BEMCOTM-3II" manufactured by Asahi Kasei Corporation)), and the site of each of the wash basin surfaces in which the antibacterial film was formed in Examples and Comparative Examples was wiped with the wipe.

Here, the "pH at which the film can be removed" indicates a pH at which the water contact angle (unit: °) of the film becomes 90° or greater when the water contact angle is measured after wiping the antibacterial film by following the above procedure. That is, as the value of the "pH at which the film can be removed" is greater, the alkali resistance is stronger. The water contact angle is measured based on the sessile drop method of JIS R3257:1999. For the measurement, FAMMS DM-701 manufactured by Kyowa Interface Science Co., Ltd. is used. More specifically, 2 μL of liquid droplets are added dropwise using pure water on an antibacterial film surface that is maintained horizontally, at room temperature of 20° C., and at the time point of 20 seconds after the dropwise addition, the contact angle is measured at 10 sites. The average value of the measurement results is designated as the contact angle. The pH is measured using a pH meter HM-30R manufactured by DKK-Toa Corporation.

(Maintenance of Antibacterial Properties)

Alkali hot spring water (pH 11) was put into each of the wash basins of Examples and Comparative Examples having the antibacterial film formed on the inner surface thereof, and after keeping the alkali spring water for one week, the antibacterial properties were evaluated.

In regard to the evaluation of antibacterial properties of antibacterial films, the test was performed according to the evaluation method described in JIS Z 2801:2010, by changing the contact time with a bacterial solution to 3 hours. The antibacterial activity value after the test was measured, and the evaluation was performed according to the following criteria. For practical use, grade "A" or "B" is preferable.

"A": The antibacterial activity value is 3.5 or higher.

"B": The antibacterial activity value is 2.0 or higher and lower than 3.5.

"C": The antibacterial activity value is 1.0 or higher and lower than 2.0.

"D": The antibacterial activity value is lower than 1.0.

In the table, "X/Y" indicates average particle size X (nm) of antibacterial microparticles/thickness Y (nm) of antibacterial film. For practical use, this value is preferably 1 or greater. The average particle size of the antibacterial microparticles and the thickness of the antibacterial film can be measured using the methods described above, respectively.

TABLE 1

| | Composition of antibacterial liquid | | | Evaluation | | | | |
|---|---|---|---|---|---|---|---|---|
| | Concentration of solid contents with respect to total mass [% by mass] | Content of compound having siloxane bond with respect to total solid content [% by mass] | Average particle size of antibacterial microparticles [μm] | Antibacterial liquid Temporal stability | Antibacterial film | | | |
| | | | | | Water contact angle [°] | X/Y | pH at which film can be removed | Maintenance of antibacterial properties |
| Example 1 | 1.5 | 70 | 0.6 | A | 45 | 3.4 | 11.5 | A |
| Example 2 | 1.8 | 75 | 0.6 | A | 43 | 2.8 | 12 | A |
| Example 3 | 2.1 | 80 | 0.6 | A | 39 | 2.4 | 13 | A |
| Example 4 | 4.2 | 90 | 0.6 | A | 34 | 1.2 | 13 | A |
| Example 5 | 0.7 | 70 | 0.6 | A | 53 | 7.3 | 11.5 | A |
| Example 6 | 1.5 | 70 | 0.6 | A | 45 | 3.4 | 11.5 | A |
| Example 7 | 1.5 | 70 | 0.6 | A | 45 | 3.4 | 11.5 | A |
| Example 8 | 1.5 | 70 | 0.6 | A | 45 | 3.4 | 11.5 | A |
| Example 9 | 1.7 | 74 | 0.6 | A | 32 | 3.0 | 11.2 | B |
| Example 10 | 1.8 | 75 | 0.6 | A | 43 | 2.8 | 12 | A |
| Example 11 | 4.5 | 70 | 3.0 | B | 33 | 5.6 | 11.5 | A |
| Comparative Example 1 | 0.9 | 50 | 0.6 | A | 58 | 5.7 | 10.5 | C |
| Comparative Example 2 | 0.7 | 39 | 0.6 | A | 66 | 7.0 | 10 | D |
| Comparative Example 3 | 9.3 | 86 | 0.6 | C | — | — | — | — |

As can be seen from Table 1, in all of the antibacterial liquids of Examples 1 to 11 in which the concentration of solid contents was less than 5% by mass with respect to the total mass of the antibacterial liquid and the content of the compound having a siloxane bond was 60% by mass or more (more preferably 70% by mass or more, even more preferably 80% by mass or more, and particularly preferably 85% by mass or more) with respect to the total solid content, the solid components did not sediment, and caking did not occur even in the case in which the antibacterial liquids were stored for a long period of time. In addition, in the films prepared using these antibacterial liquids, it was confirmed that the pH at which the film can be removed was high (had excellent alkali resistance), and the antibacterial properties could be stably maintained.

On the other hand, it was confirmed that in the antibacterial liquids of Comparative Examples 1 and 2 in which the content of the compound having a siloxane bond was less than 60% by mass with respect to the total solid content in the antibacterial liquid, the alkali resistance of the films obtained from these antibacterial liquids was degraded, and in a case in which the films were exposed to alkali for a long period of time, the antibacterial properties could not be maintained.

Furthermore, in the antibacterial liquid of Comparative Example 3 in which the concentration of solid contents was greater than 5% by mass with respect to the total mass of the antibacterial liquid, the solid components sedimented, and caking occurred in a case in which the antibacterial liquid was stored for a long period of time.

Example 12

The antibacterial liquids A-1 to A-14 were permeated through a fabric base material formed of cotton (a fabric base material that is dyed red or blue) and dried.

A red/blue dyeing test was performed on the fabric with the antibacterial liquid according to JIS L0846:2004 ("Test method for color fastness to water"), and as a result, the fastness was confirmed to be at the same level as the fastness to ethanol. The test was performed using each of the fabric base materials of hemp, silk, wool, and polyester, and the same results were obtained.

Example 13

An antibacterial film was formed using the same method as in Example 1 except for using a SUS base material instead of the resin wash basin used in Example 1, and evaluation was performed. It was confirmed that in Example 13, the antibacterial properties were the same as the antibacterial properties in Example 1.

Example 14

An antibacterial film was formed using the same method as in Example 1 except for using a brass base material instead of the resin wash basin used in Example 1, and evaluation was performed. It was confirmed that in Example 14, the antibacterial properties were the same as the antibacterial properties in Example 1.

Example 15

An antibacterial film was formed using the same method as in Example 1 except for using a polyester base material instead of the resin wash basin used in Example 1, and evaluation was performed. It was confirmed that in Example 15, the antibacterial properties were the same as the antibacterial properties in Example 1.

Example 16

An antibacterial film was formed using the same method as in Example 1 except for using a varnished wood base material instead of the resin wash basin used in Example 1, and evaluation was performed. It was confirmed that in Example 16, the antibacterial properties were the same as the antibacterial properties in Example 1.

Example 17

An antibacterial film was formed using the same method as in Example 1 except that a polyvinyl chloride base material was used instead of the resin wash basin used in Example 1, and the antibacterial liquid A-1 was continuously applied on the base material 200 times. The antibacterial film thus obtained was wiped with a wipe using a remover liquid (an alkali solution which is obtained by dissolving NaOH in pure water and of which the pH has been adjusted to 11.5), and the antibacterial film was able to be removed. In addition, it was confirmed that there was no change in the external appearance.

Example 18

The antibacterial liquid A-1 obtained in Example 1 was applied on the cloth (fabric) by spraying, the inner surface of a commercially available pottery wash basin was coated with the antibacterial liquid A-1, and the liquid was dried at room temperature for 20 minutes, thereby obtaining an antibacterial film B-18 as a coating film.

What is claimed is:

1. An antibacterial liquid comprising: an antibacterial microparticle; a binder; a nonionic surfactant; an ionic surfactant; and a solvent,
   wherein the antibacterial microparticle contains a silver-supporting inorganic oxide,
   the binder includes at least one compound having a siloxane bond,
   the solvent includes an alcohol and water,
   the concentration of solid contents is less than 5% by mass with respect to the total mass of the antibacterial liquid,
   the content of the compound having a siloxane bond is 60% by mass or more with respect to the total solid content of the antibacterial liquid, and
   the compound having a siloxane bond is a siloxane compound represented by General Formula (1),

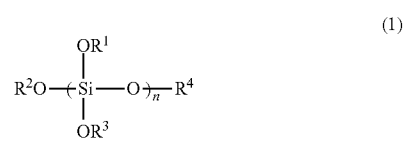

wherein $R^1$ to $R^4$ each independently represents an organic group having 1 to 6 carbon atoms and n represents an integer from 2 to 100.

2. The antibacterial liquid according to claim 1, wherein the average particle size of the silver-supporting inorganic oxide is 0.05 μm or more and less than 1.0 μm.

3. The antibacterial liquid according to claim 1, wherein the silver-supporting inorganic oxide is silver-supporting glass.

4. An antibacterial film formed using the antibacterial liquid according to claim 1.

5. The antibacterial film according to claim 4, which is not removable by a solution having a pH of 11 or lower.

6. A spray comprising the antibacterial liquid according to claim 1.

7. A cloth comprising the antibacterial liquid according to claim 1.

8. The antibacterial liquid according to claim 2, wherein the silver-supporting inorganic oxide is silver-supporting glass.

9. An antibacterial film formed using the antibacterial liquid according to claim 2.

10. An antibacterial film formed using the antibacterial liquid according to claim 3.

11. A spray comprising the antibacterial liquid according to claim 2.

12. A spray comprising the antibacterial liquid according to claim 3.

13. A cloth comprising the antibacterial liquid according to claim 2.

14. A cloth comprising the antibacterial liquid according to claim 3.

\* \* \* \* \*